United States Patent [19]
Scott et al.

[11] Patent Number: 5,833,010
[45] Date of Patent: Nov. 10, 1998

[54] CONTROL SYSTEM FOR FIELD MAKERS OF AN AGRICULTURAL MACHINE

[76] Inventors: William A. Scott, Box 216, Lucky Lake, Saskatchewan, Canada, S0L 1Z0; Rodney E. Sjoberg, Box 87, Speers, Saskatchewan, Canada, S0M 2V0

[21] Appl. No.: 828,783

[22] Filed: Mar. 27, 1997

[51] Int. Cl.[6] .................................................. A01B 25/00
[52] U.S. Cl. ................................. 172/126; 172/2; 172/130
[58] Field of Search .................................. 172/2, 6, 4–5, 172/26, 126, 127, 130, 191; 180/401

[56] References Cited

U.S. PATENT DOCUMENTS

| | | | |
|---|---|---|---|
| 4,067,394 | 1/1978 | Deckler | 172/130 X |
| 4,365,672 | 12/1982 | Robinson, Jr. et al. | 172/130 X |
| 4,381,036 | 4/1983 | Fardal et al. | 172/130 X |
| 4,488,476 | 12/1984 | Diel et al. | 172/130 X |

*Primary Examiner*—Michael J. Carone
*Assistant Examiner*—Robert Pezzuto
*Attorney, Agent, or Firm*—Adrian D. Battison; Murray E. Thrift

[57] ABSTRACT

A control apparatus for use with two opposed ground markers of an agricultural machine comprises a hydraulic circuit including a plurality of hydraulic valves for communicating fluid actuate movements of the marker cylinders and an electrical control system including a plurality of manually operable actuating switches to effect operation of said hydraulic valves. Each of the switches provides an output in response to a single actuation thereof and there is provided an output timer operable to effect operation of the hydraulic valves for a period of time sufficient to effect a stroke of the cylinders. The electrical control system provides an output in response to actuation of selected ones of the switches only in response to actuation of the switch for a predetermined time period sufficient to avoid inadvertent actuation. The switches include a first switch for actuating extension of the first marker and a second switch for actuating extension of the second marker and a single third switch for effecting retraction movement of both the first and second markers. Four indicator lights are provided for indicating the position of the markers and a control unit for effecting flashing of a respective one of the indicator lights when the respective marker is moving toward a respective one of the positions.

11 Claims, 3 Drawing Sheets

CONTROL SYSTEM FOR FIELD MAKERS OF AN AGRICULTURAL MACHINE

BACKGROUND OF THE INVENTION

Agricultural machines such as seeders/planters are often equipped with marking devices located at both left and right extremities. These field markers are usually a cantilevered disk type unit which is alternately retracted and extended as the tractor and implement approach or move away from the headland of the field.

Examples of such field markers are shown in U.S. Pat. Nos. 5,379,427 (Snyder issued Jan. 10, 1995); 5,425,427 (Haugen issued Jun. 20, 1995); 4,674,578 (Bexten issued Jun. 23, 1987); 4,986,367 (Kinzenbau issued Jan. 22, 1991) and 4,063,597 (Day issued Dec. 20, 1977) and in Canadian Patents 1,188,567 (Williamson issued Nov. 6, 1985); 1,109,341 (Kinzenbau issued Sep. 22, 1981; 1,300,433 (Haukaas issued May 12, 1992); 1,273,847 (Bexten issued Sep. 11, 1990) 1,202,529 (Wiemeyer issued Apr. 1, 1986) and 1,202,528 (Kinzenbau issued Apr. 1, 1986).

In addition U.S. Pat. Nos. 3,670,823 (Mathews issued Jun. 20, 1972) discloses a control system for field markers which allows the markers to be operated by the lifting and lowering of the planters.

Canadian Patent 881,281 (Rosselot issued Sep. 21, 1971) discloses an electrically operated marker system.

Hydraulic rams are normally included within the marker attachment linkage for purposes of extending and retracting. In order to operate marker hydraulics without utilizing two completely separate remote systems, a shuttle valve is often installed on the implement and this results in alternate right and left marker operation with only one remote connection to the tractor.

Shuttle valves and conventional remote control valves are often inadequate as follows:

a) The operator must hold the remote lever in lift or lower position throughout the period of marker retraction or extension or set the flow control at the remote so that the lever will hold a preset position until full ram stroke is achieved, in which case the lever detent system will release the lever and allow it to return to neutral under the influence of remote valve centering springs. Tractor hydraulic detent systems are often undependable and vary in performance due to normal wear and setting.

b) The operators are normally moving implement lifting levers and steering at headlands. Near-simultaneous operation of other levers such as marker levers adds to the workload and stress of the operator particularly depending on the attention required to be assured that the markers have performed retraction or extension motion to the intended completion.

c) The re-extension of one marker as opposed to the normal alternate left/right extension requires that the operator move the remote lever in a rapid shuttle to reload marker extension mode. This shuttling motion requires special attention and checking to be sure that the required marker movement has been initiated.

d) Over a period of tractor and implement operation, hydraulic slippage will often result in some degree of unintended marker extension or retraction. Less than full extension or retraction is undesirable in that the mark made in the field may be less clear due to changed disk angle or durability of the marker may be decreased due to improper structural support of the marker.

e) Desired full marker extension or retraction is difficult to achieve in shuttling operations where both markers are extended or when normal left-right-left sequence is interrupted.

f) Often tractor remote controls are completely occupied and conventional marker control systems offer no alternative to the costly addition of more remote valve assemblies in order to accommodate the marker functions.

SUMMARY OF THE INVENTION

It is one object of the present invention to provide an improved field marker control system for an agricultural machine.

According to the invention therefore there is provided an apparatus for use with an agricultural machine;

the machine comprising:
  a frame, ground wheels for transporting the frame in a working direction across the ground, a plurality of agricultural implements on the frame at positions thereon spaced transversely of the working direction;
  a first ground marker at one end of the frame including a first actuating cylinder for effecting movements of the first marker between a retracted position and an extended operating position;
  a second ground marker at an opposed end of the frame including a second actuating cylinder for effecting movements of the second marker between a retracted position and an extended operating position;

the apparatus comprising:
  a hydraulic circuit including a plurality of hydraulic valves for communicating fluid to first and second cylinders to actuate said movements of the first and second markers;
  an electrical control system including a plurality of manually operable actuating switches, the electrical control system being arranged to effect operation of said hydraulic valves in response to operation of said manually operable switches.

Preferably each of the switches is of the type providing an output in response to a singled actuation thereof and wherein is provided an output timer operable to effect operation of said hydraulic valves for a period of time sufficient to effect a stroke of the first and second hydraulic cylinders.

Preferably there is provided means for varying the time period.

Preferably electrical control system is arranged such that an output in provided in response to actuation of selected ones of said manually operable switches only in response to actuation of the switch for a pre-determined time period sufficient to avoid inadvertent actuation.

Preferably the manually operable switches include a first switch for actuating extension of the first marker and a second switch for actuating extension of the second marker and wherein each of the first and second switches includes said time delay device.

Preferably the manually operable switches includes at least one switch for actuating retraction of one or both markers and wherein the retraction is effected without a time delay.

Preferably the manually operable switches includes a first switch for effecting extension of the first marker and a second switch for effecting extension of the second marker and wherein the electrical control system includes circuit elements for checking the status of the opposite marker.

Preferably actuation of one of the first and second switches causes extension movement of the respective marker if the opposite marker is retracted.

Preferably actuation of the first and second switches causes simultaneous extension movement of both of the markers only if the first and second switches are actuated within a predetermined time period.

Preferably actuation of one of the first and second switches causes extension movement of the respective marker when the opposite marker is in the extended position only if a manually operable switch is actuated to effect a commencement of the retraction of both markers.

Preferably the manually operable switches include a first switch for effecting extension movement of the first marker, a second switch for effecting extension movement of the second marker and a single third switch for effecting retraction movement of both the first and second markers.

Preferably there is provided a plurality of indicator lights for indicating the position of the markers including a first pair of indicator lights for indicating extended and retracted positions respectively of the first marker and a second pair of lights for indicating extended and retracted positions of the second marker and including a control unit for effecting flashing of a respective one of the indicator lights when the respective marker is moving toward a respective one of the positions.

Preferably there is provided a first valve operable between first and second positions for effecting retraction and extension respectively of the first marker, a second valve operable between first and second positions for effecting extension and retraction movements respectively of the second marker and a third valve operable to supply fluid to the first and second valves and wherein the first and second valves are arranged so as to be biased to the first position effecting movement of the markers to the retracted position.

Preferably the electrical control system and the manually operable switches are located within a tractor cab and wherein the hydraulic circuit is located on the frame of the agricultural machine.

Preferably there is provided a cycle refresh top-up element for repeatedly supplying to the valves hydraulic fluid arranged to maintain the markers in a set position.

One embodiment of the invention will now be described in conjunction with the accompanying drawings in which:

DETAILED DESCRIPTION

Figure 1:
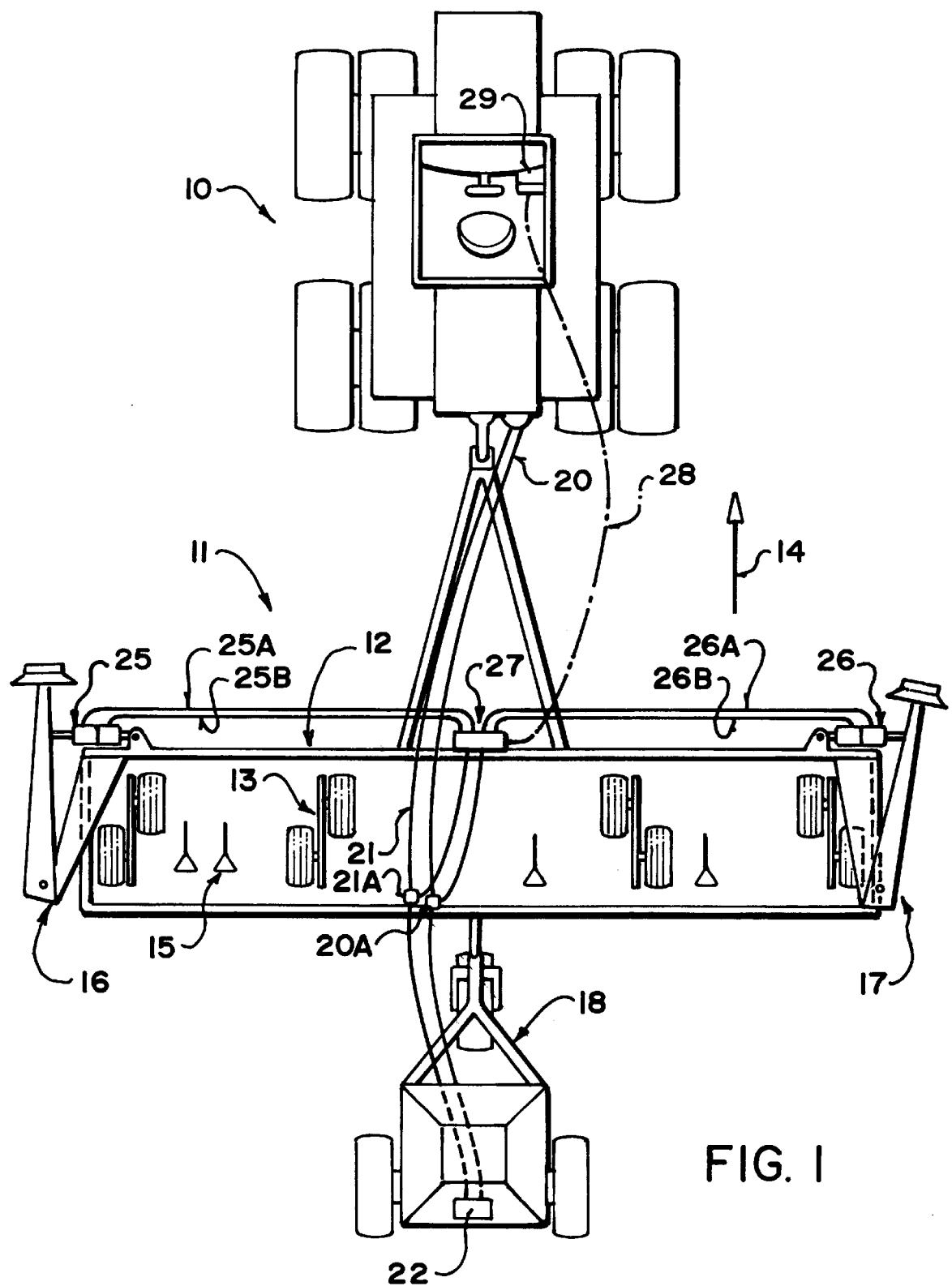
FIG. 1 is a schematic top plan view of a tractor and planter arrangement including two field markers and a control system according to the present invention.

A conventional tractor and seeder or planter combination as shown in FIG. 1 with the tractor generally indicated at 10 and the seeder or planter generally indicated at 11. The planter includes a frame 12 mounted on ground wheels 13 for movement of the planter in a working direction 14. The frame carries a plurality of ground planting elements 15 at transversely spaced positions relative to the working direction 14. At each end of the frame is mounted a respective one of a pair of ground markers 16 and 17 which are of a conventional construction and which can be moved between a folded position along side the side rail of the frame and an extended position in which the ground marker extends out from the end of the frame for marking a score mark in the ground at a position spaced outwardly from the end of the frame. The frame 12 trails a hopper trailer 18 for supplying materials to the ground engaging elements 15 for introduction into the ground. The tractor includes a hydraulic supply line 20 and a hydraulic return line 21 for driving a fan motor 22 of the hopper trailer 18.

The above arrangement is of course entirely conventional and is described herein merely to explain the context of the control system described in more detail hereinafter.

It will be further appreciated that the present invention is not limited to seeders or planters but can be used with any agricultural machine which incorporates a pair of field markers. This arrangement can be used with sprayers, granular applicators, cultivators and the like all of which includes a plurality of agricultural implements at transversely spaced locations on the frame for effecting an agricultural action.

The control system for the markers includes for each marker 16, 17 a respective one of a pair of hydraulic cylinders 25 and 26 each of which is operable by supply of hydraulic fluid to effect movement inwardly and outwardly between an extended and retracted positions of the cylinder for extending and retracting the marker. Thus the cylinder 25 includes a hydraulic supply line 25A and a second hydraulic supply line 25B and the cylinder 26 includes a first hydraulic supply line 26A and a second hydraulic supply line 26B. The hydraulic supply lines communicate with a hydraulic control circuit 27 mounted on the frame 12 generally at a position centrally of the frame and adjacent the hitch to the tractor. The hydraulic control circuit 27 is controlled by an electrical cable providing electrical control signals thereto through a control line 28. An electrical control unit 29 is mounted in the cab of the tractor for operation by the tractor operator and includes a control panel 30 and an electrical control system 31.

Figure 2:
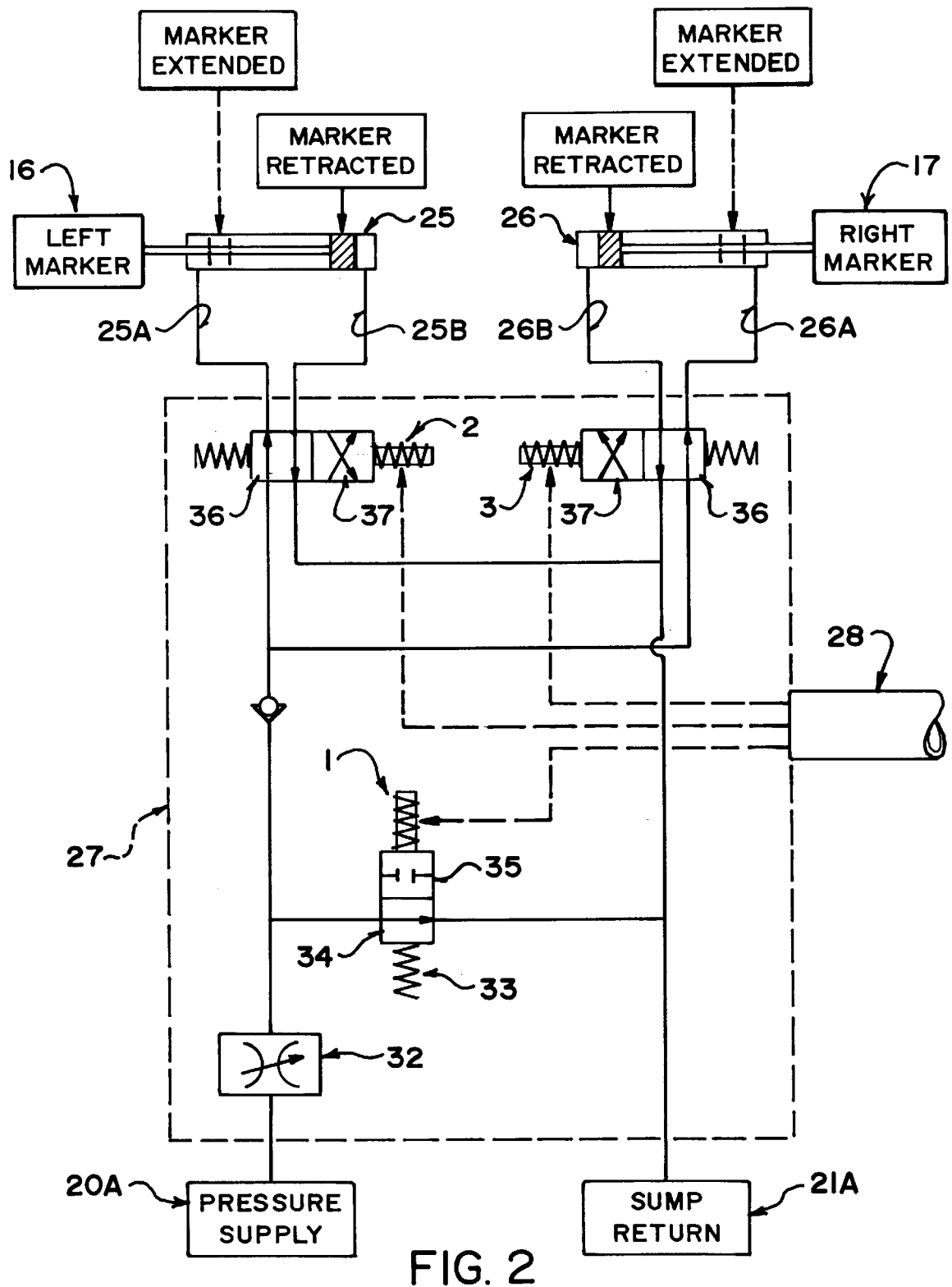
FIG. 2 is a circuit layout for the hydraulic control circuit for the control system of FIG. 1.

The hydraulic circuit shown in FIG. 2 comprises a pressure supply 20A which is tapped into the line 20 of the hydraulic system of the tractor. A sump return is indicated at 21A which is also tapped into the line 21 of the sump return of the hydraulic system of the tractor. A variable flow rate control valve 32 controls the supply of fluid from the pressure supply 20A. A first solenoid valve 1 is of the type which actuated by the solenoid against a bias of a spring 33 so that the valve normally sits in a first position 34 but can be moved to a second position 35. In the first position 34 the flow from the pressure supply normally passes through to the sump return and therefore does not actuate the system.

The circuit 27 further includes a second solenoid 2 and a third solenoid 3. The second solenoid 2 is connected to the lines 25A and 25B and controls communication of pressure fluid either to the line 25A or to the line 25B depending upon the position of the solenoid valve. Thus the solenoid valve includes a first position 36 and a second position 37. The first position provides supplier fluid to the line 25A which causes retraction of the left marker to the marker retracted position indicated. The position 37 of the solenoid valve effects the opposite movement supplying fluid through the line 25B to the extension side of the piston so the piston and the marker move to the marker extended position.

The solenoid 3 similarly includes two positions 36 and 37 and is arranged symmetrically to the solenoid valve 2.

In the normal positions of the solenoid valves, therefore, the system is shut off in that the fluid is merely dumped from the pressure supply to the sump return. When solenoid 1 is operated both markers are moved to the marker retracted position.

When solenoid 1 and solenoid 2 are activated the left marker is moved to the extended position and the right marker is moved to the retracted position.

When solenoid 1 and solenoid 3 are actuated the right markers move to the extended position and the left marker move to the retracted position.

When solenoids 1, 2 and 3 are all actuated, both markers are moved to the extended positions.

Figure 3:
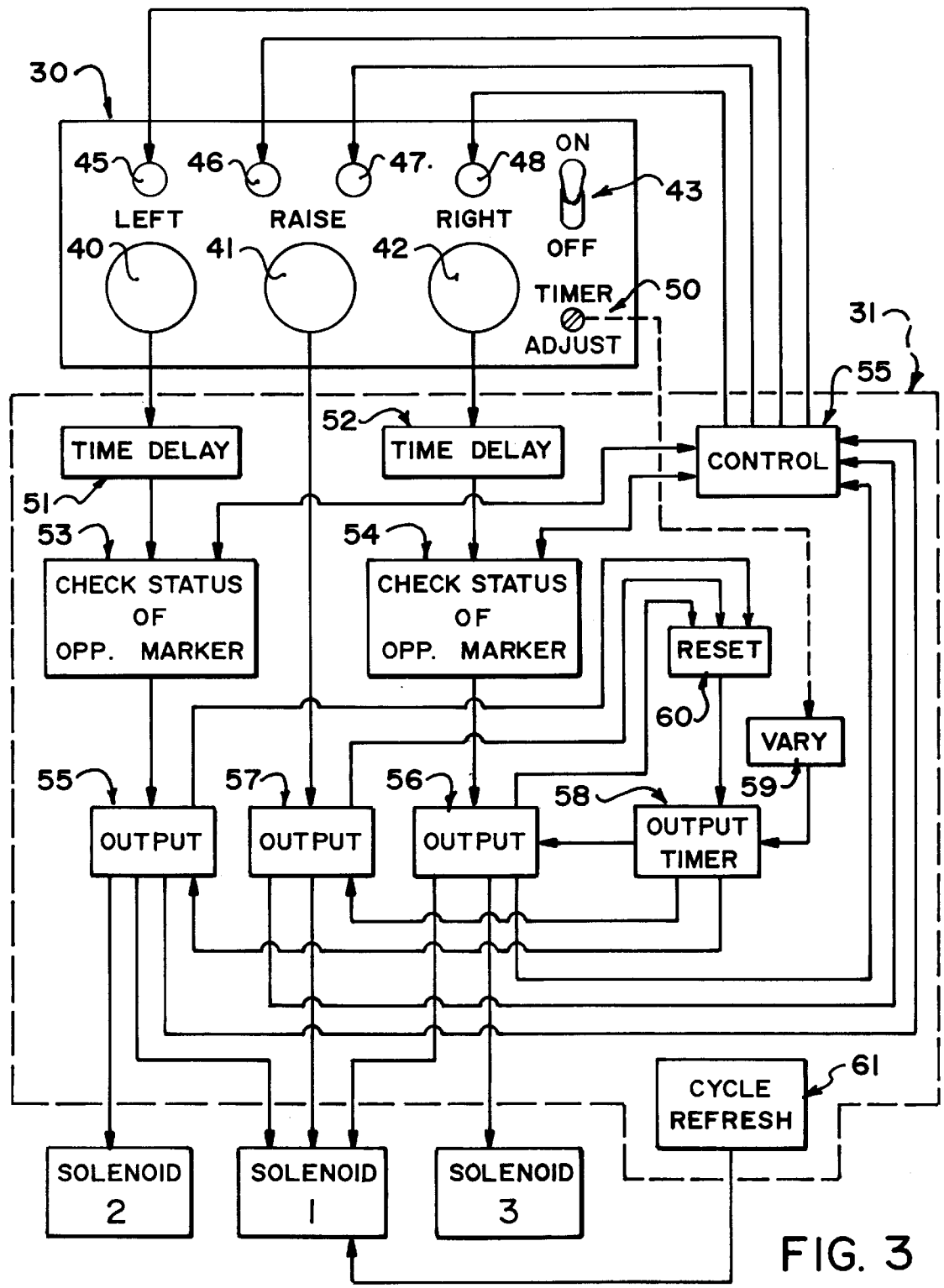
FIG. 3 is a schematic illustration of the electrical control elements of the control system of FIG. 1.

In FIG. 3 is shown the electrical control system for the hydraulic circuit which includes the control panel 30. The control panel includes three press buttons 40, 41 and 42, and an on-off switch 43 and four display lights 45, 46, 47 and 48. A timer adjust screw 50 is also available on the panel 30.

Each of the switches, 40, 41 or 42 is operable against a spring bias by manual depression to generate an output signal for applying a signal into the control circuit 31.

The control circuit 31 includes for each of the buttons 40 and 42 a time delay circuit 51, 52 such that an output is generated by the time delay in response to depression of those buttons only if the button is held for a predetermined time period which can be of the order of 0.5 seconds to prevent inadvertent contact causing generation of an output.

Furthermore the output from each time delay 51, 52 is communicated to a status check element 53, 54 which checks the status of the opposite marker through a control unit 55 which maintains the information on the status of each of the markers at all times. The control unit and the status check element 53, 54 are arranged to provide a signal to an output unit 55, 56 only in certain circumstances, as described hereinafter.

The button 41 communicates directly to an output unit 57 so that any contact with the button 41 generates an output from the output unit 57. Each of the output units 55, 56, 57 is controlled by an output timer 58 so that the output is controlled for a period of time sufficient to effect a complete stroke of movement of the marker. This output timer can be varied by the timer adjuster screw 50 through a control unit 59. The output timer is reset by a reset control element 60 each time an output is generated so that a full period of output timer is generated for each output regardless of the condition of the system at the time that the output is commenced.

The output from each of the output units 55, 56, 57 is communicated respectively to the solenoids 2, 3 and 1.

The output 55 and 56 are arranged such that an output is supplied to each of the solenoids 2 and 3 continually while the system requires that the respective marker be extended. The output is supplied from the output unit 57 to the solenoid 1 only for a time period sufficient to effect the necessary stroke of movement. After that stroke Is completed, the solenoid 1 is deactivated. A cycle refresh unit 61 is activated on a periodic basis to actuate solenoid 1 so as to repeatedly supply additional top up fluid through the solenoid valves 2 and 3 to maintain the markers in the position in which they are set. This overcomes problems of slight leakage which would other wise allow the markers to move from the set position. The time period of the top up can be set in accordance with requirements both for the spacing and the amount of time over which the top up is supplied.

The electrically actuated hydraulic control assembly is thus installed within the normal hydraulic circuit of a tractor and implement to route oil in the retraction and extension of the markers as required by the operator. This hydraulic control assembly is mounted on the implement or on the tractor and is connected by an electric wire harness to an electronic switching unit which is mounted convenient to the operator's station. The three rebounding switches (piano key action push-buttons) are mounted within the face of the switching unit.

The switching unit contains the integrated circuit which electronically monitors marker location and motion of the markers such that:

a) Momentary depression (pushing) of a right switch (relative location in front face plate of switching unit) causes extension of the right marker. Likewise, the left switch controls extension of the left marker. Pushing the centre switch retracts any extended markers.

b) The left and right markers may be simultaneously extended by pushing both respective switches.

c) The left and right switches initiate motion only if depressed for at least one-half second.

d) In order to obtain simultaneous extension of the left and right markers, it is necessary to depress the respective left and right switches within two seconds of each other.

e) If either marker is in process of extending or is in extended state, then extension of either marker requires momentary retraction of the markers by pushing the center switch and subsequent depression of the selected left and/or right switches depending on the desired configuration.

This left/right switch delay, the lapse time on simultaneous marker extension and the requirement for momentary retraction of an extended marker are included to prevent inadvertent marker extension.

Depression of the centre switch initiates retraction of either or both extended markers instantaneously so that the inclination is for the markers to be most likely positioned in the, generally safer, retracted state without requiring undue operator attention, which tends to instill operator confidence in the ability to readily achieve the most safe mode of the markers being retracting or retracted.

The four indicator lights are provided each comprising a single light emitting diode which is associated with each position or motion of the markers. The right and left switches each have one of these lights in proximity to indicate the extended state of the respective marker. The indicator lights are of different colors so that the light near to the right switch is red and the light near to the left switch is amber. Two green lights are located in proximity to the centre switch, each to indicate a retracted state of the respective marker. Each light is controlled so that it glows in steady state when its associated marker fully moved to the respective retracted/extended position and is flashing during the period of motion to the intended position.

The electronic "latch" ensures that no output signals are generated upon start-up, that is, after the electronic switching unit has been turned off either by the operator positioning the master switch in the "off" position or by normal tractor shut-down. Therefore, markers will remain static on start-up until the operator pushes the center switch which will reset the control and permit the operator to again initiate desired extension/retraction.

The hydraulic control assembly is generally mounted at the centre of the implement near the point of attachment of the implement hitch to its main frame. This hydraulic control assembly contains a centre section valve and a pair of directional valves. The tractor oil pressure pump and reservoir are connected to the center section of the hydraulic control assembly by hoses. When the center section valve is activated the directional valves receive oil under pressure and concurrently route low pressure oil back to the centre section gallery which is associated with the system reservoir. Each of the directional valves is dedicated to and connected by hoses to respective left/right marker actuators hydraulic rams.

The center section valve and directional valves are each two position units and are activated by solenoid cartridges when current flows through the cartridge coil as directed by the electronic controller. Springs return these valves to initial positions when the coil is de-energized.

The centre section of the hydraulic valve assembly may be configured to accommodate both open and closed center hydraulic operation. At the time of installation to the tractor or implement the prescribed adjustment will be made to select either the open or closed center operation.

The extension of a marker requires that the directional valve be energized and that the center section valve be simultaneously energized whereas retraction of a marker is achieved by the combination of a directional valve being de-energized and the center section being valve energized. When the center valve section is de-energized (in either open or closed centre application), this will not direct oil under pressure to either of the directional valves. Therefore, electrical short circuit due to wire disconnect or other failure will not result in marker extension.

The center section valve is moved to the energized position when extension or retraction is initiated by depression of a switch and this valve is then held in this position to direct oil from the tractor pressure source for a period (locked-on time) just sufficient to allow for full extension or retraction, unless another switch depression interrupts or lengthens the normal period (locked-on time). The locked-on time setting (factory normal setting fifteen seconds) is adjustable to accommodate various actuator and hydraulic circuit characteristics by rotation of a recessed screw in the face of the control box.

The variable (adjustable orifice) flow control valve is included within the hydraulic control to provide for selection of an appropriate speed of marker motion. The setting of this component upon initial operation will allow for various marker weights and mechanisms and the desired locked-on time setting required will depend upon this adjustment.

The center section valve is, therefore, generally de-energized except when extension or retraction motion is required. The directional valves will function in the energized or de-energized state for extended periods, as directed by the operator, which is usually the time required for the implement to travel between headlands.

The function and structural support and durability of markers is generally enhanced by the maintenance of a positive pressure within the hydraulic actuators either holding marker or markers out to the full extended position or in to the folded or cradled position. However, continual long periods of connection directly between directional valves (hence marker actuators and other locations invisible to the operator) and tractor hydraulic system pressure source is inadvisable due to concerns regarding:

(a) Inherent open centre hydraulic system operational characteristic whereby generally free flow through hydraulic valves is required when these valves are in continuous connection with tractor pressure source;

(b) Potential continuous delivery of oil to remote invisible locations which carries the risk of reservoir depletion due to hydraulic conduit or connection failure; and (c) Safety requirements (especially that no condition of failure of electrical connection will result in unintended extension nor unintended continuous retraction of markers).

These, seemingly, opposing operational parameters have been achieved by an electronically programmed periodic cycling of the centre section valve (i.e. energized for one to two seconds per minute). This results in:

a) an advantageous periodic make-up of normal hydraulic fluid slippage b) accommodation of the general requirement of a free flowing return to reservoir which is characteristic of open centre hydraulic systems c) interruption of potentially catastrophic loss of system fluid.

d) prevention of unintended extension or unintended continuous retraction of markers The hydraulic control assembly which is located on the implement frame is normally, most readily, connected to the tractor hydraulic pressure source and reservoir through couplers to an available/conventional remote valve on the tractor. Marker function requires that such remote valve operating lever be locked in an open position in order to provide continuous connection to the tractor pressure source and reservoir. Tractor operator's manuals generally provide specific instruction, recommending the preferred direction and method of lever retention in such continuous linkage.

In the event of a need to expand tractor remote facility, as often happens with the addition of markers to an implement, this can be achieved in many cases by tapping into a "power-beyond" source apart from normal remote couplings. Such provision for expansion of hydraulic capability is generally described in tractor operator's manuals or is provided upon request by tractor dealership service departments.

For safety purposes, the check valve within the hydraulic control assembly insists that connection of tractor pressure source and reservoir is unidirectional and that the system will function only to retract a marker in the case of any accidental electric power failure. Thus, in the worst case scenario (i.e. electric power failure to a directional valve and continuing periodic cycling of the centre section valve in its automatic make-up mode) a marker associated with the disabled directional valve, if extended, will retract in gradual steps (approximately one minute intervals).

The hydraulic control assembly may be mounted on the tractor frame instead of the implement frame. This would then require that four directional hoses be connected to run from the tractor to the implement instead of the more normal pair (pressure and tank) of lines. In any case, hoses from directional valves (i.e. work ports of hydraulic control assembly) must each be connected to a specified port of the left/right hydraulic actuators. In all cases disconnect or connection of the tractor and implement often require decompression of or release of oil lines that are pressurized. This may be achieved by moving remote lever to neutral or by engine shut down (if coupled to a power-beyond feature) and subsequent operation of switches to cycle valves.

We claim:

1. An agricultural machine comprising:

a frame, ground wheels for transporting the frame in a working direction across the ground, a plurality of agricultural implements on the frame at positions thereon spaced transversely of the working direction;

a first ground marker at one end of the frame including a first actuating cylinder for effecting movements of the first marker between a retracted position and an extended operating position;

a second ground marker at an opposed end of the frame including a second actuating cylinder for effecting movements of the second marker between a retracted position and an extended operating position;

a hydraulic circuit including a plurality of hydraulic valves for communicating fluid to the first and second cylinders to actuate said movements of the first and second markers;

and an electrical control system including a plurality of manually operable actuating switches, the electrical control system being arranged to effect operation of said hydraulic valves in response to operation of said manually operable switches;

the manually operable switches including:
a first switch for effecting movement of the first marker to the extended position;
a second switch for effecting movement of the second marker to the extended position;
and a retraction switch system for causing the first and second markers to move toward the retracted positions thereof;
the electrical control system being arranged such that movement of both the first and second markers to the extended position can be effected by actuation of the first and second switches;
wherein the electrical control system includes circuit elements for checking the status of the markers and wherein actuation of one only of the first and second switches causes extension movement of the respective marker only if the opposite marker is retracted from the extended position thereof.

2. The machine according to claim 1 including four indicator lights including a first pair of indicator lights for indicating extended and retracted positions respectively of the first marker and a second pair of lights for indicating extended and retracted positions of the second marker including a control unit for effecting flashing of a respective one of the indicator lights when the respective marker is moving toward a respective one of the positions.

3. The machine according to claim 1 including a first valve operable between first and second positions for effecting retraction and extension respectively of the first marker, a second valve operable between first and second positions for effecting extension and retraction movements respectively of the second marker and a third valve operable to supply fluid to the first and second valves and wherein the first and second valves are arranged so as to be biased to the first position effecting movement of the markers to the retracted position.

4. The machine according to claim 3 including a cycle refresh top-up element for periodically and repeatedly causing the third valve to supply to the first and second valves hydraulic fluid arranged to maintain the markers in a set position.

5. An agricultural machine comprising:
a frame, ground wheels for transporting the frame in a working direction across the ground, a plurality of agricultural implements on the frame at positions thereon spaced transversely of the working direction;
a first ground marker at one end of the frame including a first actuating cylinder for effecting movements of the first marker between a retracted position and an extended operating position;
a second ground marker at an opposed end of the frame including a second actuating cylinder for effecting movements of the second marker between a retracted position and an extended operating position;
a hydraulic circuit including a plurality of hydraulic valves for communicating fluid to the first and second cylinders to actuate said movements of the first and second markers;
and an electrical control system including a plurality of manually operable actuating switches, the electrical control system being arranged to effect operation of said hydraulic valves in response to operation of said manually operable switches;
the manually operable switches including:
a first switch for effecting movement of the first marker to the extended position;
a second switch for effecting movement of the second marker to the extended position;
and a single third switch for causing the both the first and second markers to move toward the retracted positions thereof unless the marker to be moved is already in the retracted position.

6. The machine according to claim 5 wherein each of the first and second switches includes a time delay device such that movement of the respective marker to the extended position only occurs in the event that the respective switch is actuated for a predetermined time period and wherein movement of the markers toward the retracted positions thereof is effected by actuation of the third switch without a time delay.

7. The machine according to claim 5 wherein the electrical control system includes circuit elements for checking the status of the markers and wherein actuation of one of the first and second switches causes extension movement of the respective marker only if the opposite marker is retracted from the extended position thereof.

8. The machine according to claim 5 wherein the electrical control system includes circuit elements for checking the status Of the markers and wherein actuation of the first and second switches causes simultaneous movement of both to the extended positions thereof of the markers only if the first and second switches are actuated within a predetermined time period.

9. The machine according to claim 5 wherein the electrical control system is arranged such that actuation of one of the first and second switches causes movement of the respective marker toward the extended position when the opposite marker is in the extended position only if the third switch is actuated prior to said actuation of said one of the first and second switches.

10. An agricultural machine comprising:
a frame, ground wheels for transporting the frame in a working direction across the ground, a plurality of agricultural implements on the frame at positions thereon spaced transversely of the working direction;
a first ground marker at one end of the frame including a first actuating cylinder for effecting movements of the first marker between a retracted position and an extended operating position;
a second ground marker at an opposed end of the frame including a second actuating cylinder for effecting movements of the second marker between a retracted position and an extended operating position;
a hydraulic circuit including a plurality of hydraulic valves for communicating fluid to the first and second cylinders to actuate said movements of the first and second markers;
and an electrical control system including a plurality of manually operable actuating switches, the electrical control system being arranged to effect operation of said hydraulic valves in response to operation of said manually operable switches;
the manually operable switches including:
a first switch for effecting movement of the first marker to the extended position;
a second switch for effecting movement of the second marker to the extended position;
and a retraction switch system for causing the first and second markers to move toward the retracted positions thereof;

the electrical control system being arranged such that actuation of the first and second switches causes simultaneous movement of both to the extended positions thereof of the markers only if the first and second switches are actuated within a predetermined time period.

11. An agricultural machine comprising:

a frame, ground wheels for transporting the frame in a working direction across the ground, a plurality of agricultural implements on the frame at positions thereon spaced transversely of the working direction;

a first ground marker at one end of the frame including a first actuating cylinder for effecting movements of the first marker between a retracted position and an extended operating position;

a second ground marker at an opposed end of the frame including a second actuating cylinder for effecting movements of the second marker between a retracted position and an extended operating position;

a hydraulic circuit including a plurality of hydraulic valves for communicating fluid to the first and second cylinders to actuate said movements of the first and second markers;

and an electrical control system including a plurality of manually operable actuating switches, the electrical control system being arranged to effect operation of said hydraulic valves in response to operation of said manually operable switches;

the manually operable switches being arranged such that:

a first arrangement of actuation thereof causes both markers to be moved to the retracted position;

a second arrangement of actuation thereof causes both markers to be moved to the extended position;

a third arrangement of actuation thereof causes the first marker to be moved to the retracted position and the second marker to be moved to the extended position;

and a fourth arrangement of actuation thereof causes the second marker to be moved to the retracted position and the first marker to be moved to the extended position.

* * * * *